(12) United States Patent
Harriman

(10) Patent No.: US 6,182,177 B1
(45) Date of Patent: Jan. 30, 2001

(54) METHOD AND APPARATUS FOR MAINTAINING ONE OR MORE QUEUES OF ELEMENTS SUCH AS COMMANDS USING ONE OR MORE TOKEN QUEUES

(75) Inventor: David J. Harriman, Sacramento, CA (US)

(73) Assignee: Intel Corporation, Santa Clara, CA (US)

(*) Notice: Under 35 U.S.C. 154(b), the term of this patent shall be extended for 0 days.

(21) Appl. No.: 08/874,917

(22) Filed: Jun. 13, 1997

(51) Int. Cl.[7] ....................................................... G06F 13/00
(52) U.S. Cl. ............................... 710/112; 710/39; 710/52
(58) Field of Search ................................ 395/292, 859, 395/856, 872, 291, 200.65, 200.81, 200.82, 200.83, 200.55, 200.37; 710/112, 111, 39, 36, 52; 709/207, 225, 235, 251, 252, 253

(56) References Cited

U.S. PATENT DOCUMENTS

| | | | |
|---|---|---|---|
| 4,587,632 | * | 5/1986 | Ditzel ..................................... 711/213 |
| 4,819,229 | * | 4/1989 | Pritty et al. ........................... 370/455 |
| 4,914,704 | * | 4/1990 | Cole et al. .............................. 381/43 |
| 5,263,161 | * | 11/1993 | Barth et al. ........................... 710/200 |
| 5,263,169 | * | 11/1993 | Genusov et al. ...................... 395/800 |
| 5,353,418 | * | 10/1994 | Nikhil et al. .......................... 709/108 |
| 5,386,560 | * | 1/1995 | McCauley et al. ................... 711/165 |
| 5,412,799 | * | 5/1995 | Papadopoulos ....................... 395/500 |
| 5,499,349 | * | 3/1996 | Nikkil et al. ............................ 712/26 |
| 5,581,735 | * | 12/1996 | Kajitani et al. ....................... 711/169 |
| 5,832,240 | * | 11/1998 | Larsen et al. ......................... 710/105 |

OTHER PUBLICATIONS

Intel Corporation, *Accelerated Graphics Port Interface Specification*, Revision 1.0, Jul. 31, 1996, pp. ii–x and 1–112.

\* cited by examiner

*Primary Examiner*—Ayaz R. Sheikh
*Assistant Examiner*—Ario Etienne
(74) *Attorney, Agent, or Firm*—Jeffrey S. Draeger (57) ABSTRACT

A method and apparatus for queuing commands. An apparatus of the present invention utilizes one or more token queues and a storage block to avoid maintaining multiple separate queues and/or to facilitate reordering of queued elements. The apparatus includes at least one token queue and a token assignment circuit which queues a selected token in a token queue. A storage block stores an element in a slot corresponding to the selected token. One system employing the present invention includes a processor, a bus agent, a memory controller, and a main memory. The memory controller queues tokens representing received commands into appropriate command queues.

35 Claims, 6 Drawing Sheets

METHOD AND APPARATUS FOR MAINTAINING ONE OR MORE QUEUES OF ELEMENTS SUCH AS COMMANDS USING ONE OR MORE TOKEN QUEUES

BACKGROUND OF THE INVENTION

1. Field of Invention

The present invention pertains to the field of computer systems. More particularly, the present invention relates to queuing prioritized instructions, commands, or other elements.

2. Art Background

Computer systems utilize several varieties of command execution units which receive commands from a queuing or prefetching mechanism. For example, a central processing unit may process commands that are fetched as a part of a computer program. A memory controller may process commands requesting that data be written to or read from a portion of memory, and an I/O controller may process commands and data passing to and from I/O devices.

Each of these command execution units may process commands of varying length and/or urgency. A memory controller may receive singular access requests or may receive requests for larger blocks of memory. An I/O controller may receive low priority commands such as a request for data, or high priority commands such as an interrupt issued due to a power interruption. Moreover, some commands are simply more intricate, such as processor commands which require one or more memory accesses.

Due to the varying lengths and urgencies of commands processed, priorities may be assigned. I/O systems often assign different priorities to different interrupts, and these prioritized commands may be more optimally executed if out-of-order processing is available. Similarly, processor and memory commands may often be executed out-of-order to improve efficiency. Other elements such as data words or data packets may also be separated by types or priorities in data retrieval or network access environments. Accordingly, it is not always desirable to use a single queue as traditionally done with in-order processing.

Unfortunately, queuing elements for out-of-order processing may require costly storage and tracking hardware. For example, multiple queues may be used to allow out-of-order command execution by separating commands into queues by their priority and then favoring the high priority queue(s). This approach may consume an unnecessarily large amount of hardware, especially if the system must be able to maintain a queue of a predetermined number of entries. In such a case, it may be necessary to provide each queue with the predetermined number of entries unless the system guaranties a certain mix of priorities for the received commands. Since such a guaranteed mix of priorities is unlikely, the queuing mechanism typically must handle the worst case.

Additionally, even when there is no predetermined queuing requirement, queue length for each separate queue must be chosen in some manner, often by analyzing a predicted command stream composition. Queue space is often wasted since command streams are not likely to be continuously uniform and predictable during normal operation. Additionally, queue slots which were included to provide for a worst case mix of commands may rarely be used.

One environment in which queuing prioritized commands may be appropriate is prioritized memory access. For example, some microprocessors allow read commands to be reordered around write commands by maintaining writes in a separate write buffer. As previously mentioned, such use of multiple queues may be less than optimal because write queue slots may not be used to store read command information and read queue slots cannot store write command information. Additionally, this technique does not accommodate multiple priorities of read or write commands.

The Accelerated Graphics Port (A.G.P.) Interface Specification, Revision 1.0, Jul. 31, 1996, available from Intel Corporation of Santa Clara, Calif., defines an interface protocol between a bus master (typically a graphics accelerator) and a memory controller. Since the accelerated graphics port provides four different types of commands (normal priority reads, normal priority writes, high priority reads, and high priority writes), at least the use of separate read and write queues may be appropriate. The A.G.P. Specification, however, does not suggest the use of any particular hardware implementation for such queues, and prior art queuing techniques may prove inefficient, especially since an A.G.P. compliant memory controller is required to be able to queue a predetermined number of commands.

Thus, some prior art command queuing techniques fail to allow out-of-order command execution for multiple types or priorities of commands. Other techniques, such as multiple queue approaches may inefficiently utilize storage space. Accordingly, the prior art does not provide appropriate and efficient techniques for out-of-order processing of multiple types of commands or other elements in a computer system.

SUMMARY

An apparatus of the present invention utilizes one or more token queues and a storage block to avoid maintaining multiple separate queues and/or to facilitate reordering of queued elements. The apparatus includes at least one token queue and a token assignment circuit which queues a selected token in a token queue. A storage block stores an element in a slot corresponding to the selected token. One system employing the present invention includes a processor, a bus agent, a memory controller, and a main memory. The memory controller includes one or more token queues and logic to queue tokens representing received commands into the appropriate queues.

BRIEF DESCRIPTION OF THE FIGURES

The present invention is illustrated by way of example and not limitation in the Figures of the accompanying drawings.

DETAILED DESCRIPTION

The present invention provides a method and apparatus for maintaining one or more queues of varying types of elements. In the following description, numerous specific details such as command types, command priorities, and queue implementations are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

As will be further discussed below, the present invention provides a method and apparatus for maintaining multiple queues that may be advantageously applied in a variety of contexts. Through the use of representative tokens, individual queues of different types of elements may be maintained without bearing the hardware penalty associated with queuing the entire element in multiple separate queues. Instead, a storage block may be used to store all commands, with the representative tokens being used to access a selected element. The elements may be commands and/or data or data packets which may have different priorities or types. Additionally, even a single token queue may be used in a case where sorting or rearranging elements is desired.

Figure 1:
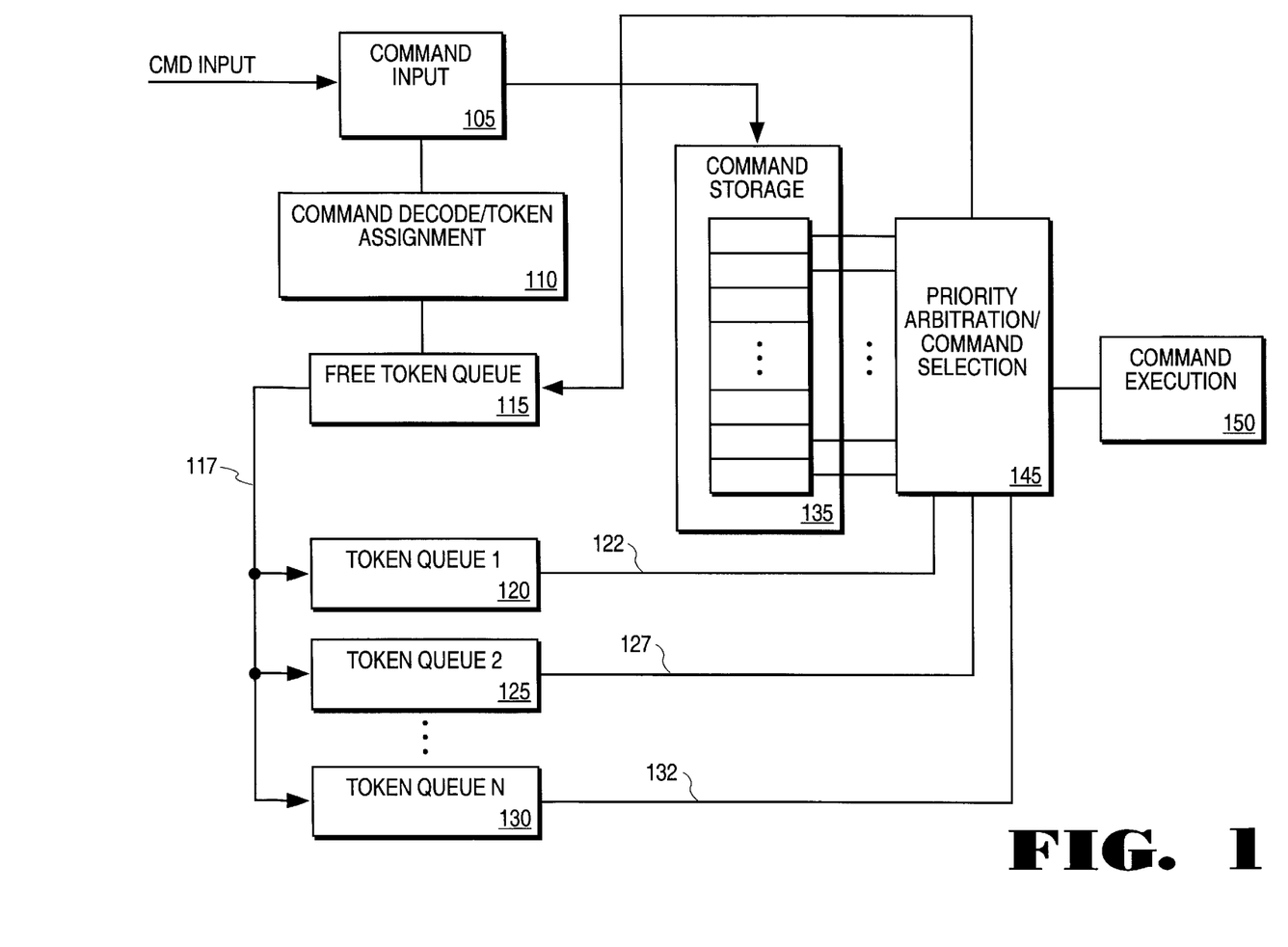
FIG. 1 illustrates one embodiment of the queuing logic of the present invention.

FIG. 1 illustrates one embodiment of the queuing logic of the present invention. A command input circuit 105 is coupled to receive incoming commands for this queuing logic. A command decode and token assignment circuit 110 receives enough command information from the command input circuit 105 to categorize incoming commands into one of a predetetermined number of categories. Commands may be separated into categories by command type, command priority, or some other characteristic.

As incoming commands are received, the command decode and token assignment circuit 110 selects an empty slot in a command storage block 135 by consulting a free token queue 115 to locate available slots. The free token queue 115 is a queue which maintains a number of entries corresponding to available slots in the command storage block 135. As these slots in the command storage block 135 are filled by incoming commands, tokens are removed from the free token queue 115. Tracking of entries in the free token queue 115 may be accomplished by maintaining a list of available slots, or by maintaining an array of bits indicating the status of each slot in the command storage block 135.

As illustrated, the command queuing logic includes a predetermined number of token queues (N) corresponding to the number of categories into which the command decode and token assignment circuit 110 separates incoming commands. As indicated by line 117, the free token queue 115 passes tokens to one of the token queues 120,125, or 130, depending upon the categorization determined. Thus, each of the token queues 120,125, and 130 may correspond to a different type or priority of command.

A priority arbitration and command selection circuit 145 selects a token from one of the N queues based on a priority scheduling algorithm. This circuit selects a highest priority token from the head of the appropriate token queue available on one of the lines 122, 127, and 132. The selected token indicates an entry in the command storage block 135 and allows the priority arbitration and command selection circuit 145 to access the appropriate command. The priority arbitration and command selection circuit 145 may have one or more read ports, depending on whether multiple commands are to be simultaneously withdrawn from the command storage block 135, and also whether the reads from the command storage block 135 represent a critical speed path. After selection, the commands are passed to a command execution circuit 150.

Figure 2:
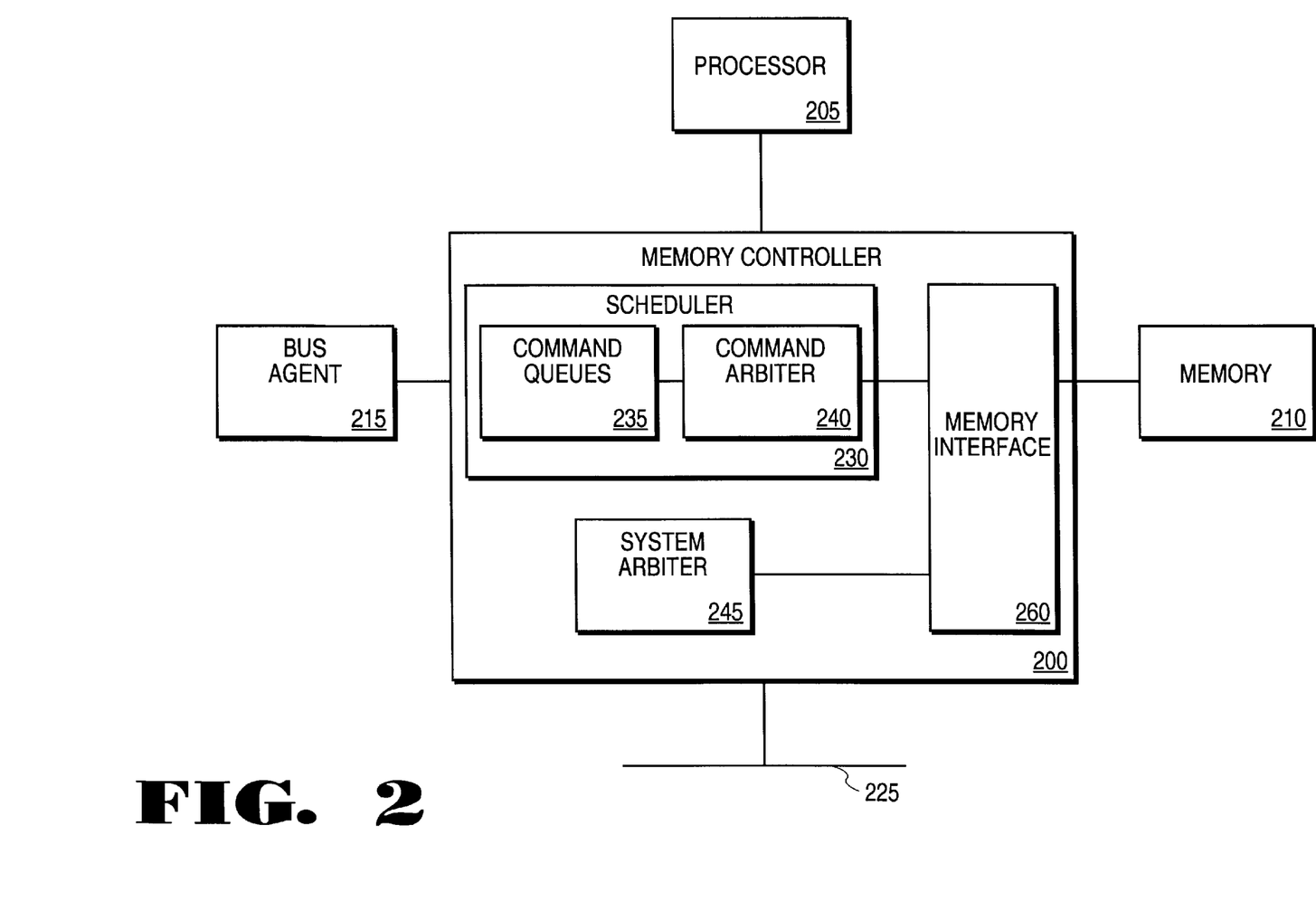
FIG. 2 illustrates an embodiment of a system which uses queuing logic of the present invention.

One system in which the command queuing logic of FIG. 1 may be used is illustrated in FIG. 2. A memory controller 200 provides a processor 205, a system bus 225, and a bus agent 215 access to a memory 210. In one embodiment, the memory 210 is a dynamic random access memory system; however, in alternate embodiments, the memory 210 may be mechanical storage such as a hard drive or other input/output device, or may be an abstract memory space including disk space, static and/or dynamic memory, and other memory devices. In one embodiment, a system arbiter 245 handles a first type of command from the bus agent 215, the system bus 225, and the processor 205, while a scheduler 230 handles a second type of command from the bus agent 215. The scheduler 230 contains the command queuing logic of FIG. 1 as indicated by a command queue block 235 and a command arbiter 240. In addition to the system shown in FIG. 2, the command queuing techniques discussed may be used in other system configurations which are known in the art.

Commands selected by the command arbiter 240 are presented to a memory interface circuit 260, where they may also compete for access to the memory 210 with other commands from the processor 205 and the system bus 225. For example, in one embodiment, the bus agent 215 is a graphics accelerator which communicates with the memory controller 200 via the Accelerated Graphics Port (A.G.P.) protocol. In this embodiment, the system arbiter includes logic to interface with the processor 205, a second interface of the bus agent 215, and any Peripheral Components Interconnect (PCI) bus agents on system bus 225. The second interface of the bus agent 215 may allow a separate type of transaction (e.g., a FRAME# based transaction) to configure and send certain commands to the bus agent 215. FRAME# based transactions are initiated using the well known FRAME# signal as opposed to using, for example, the PIPE# signal described in the A.G.P. Specification.

Figure 3:
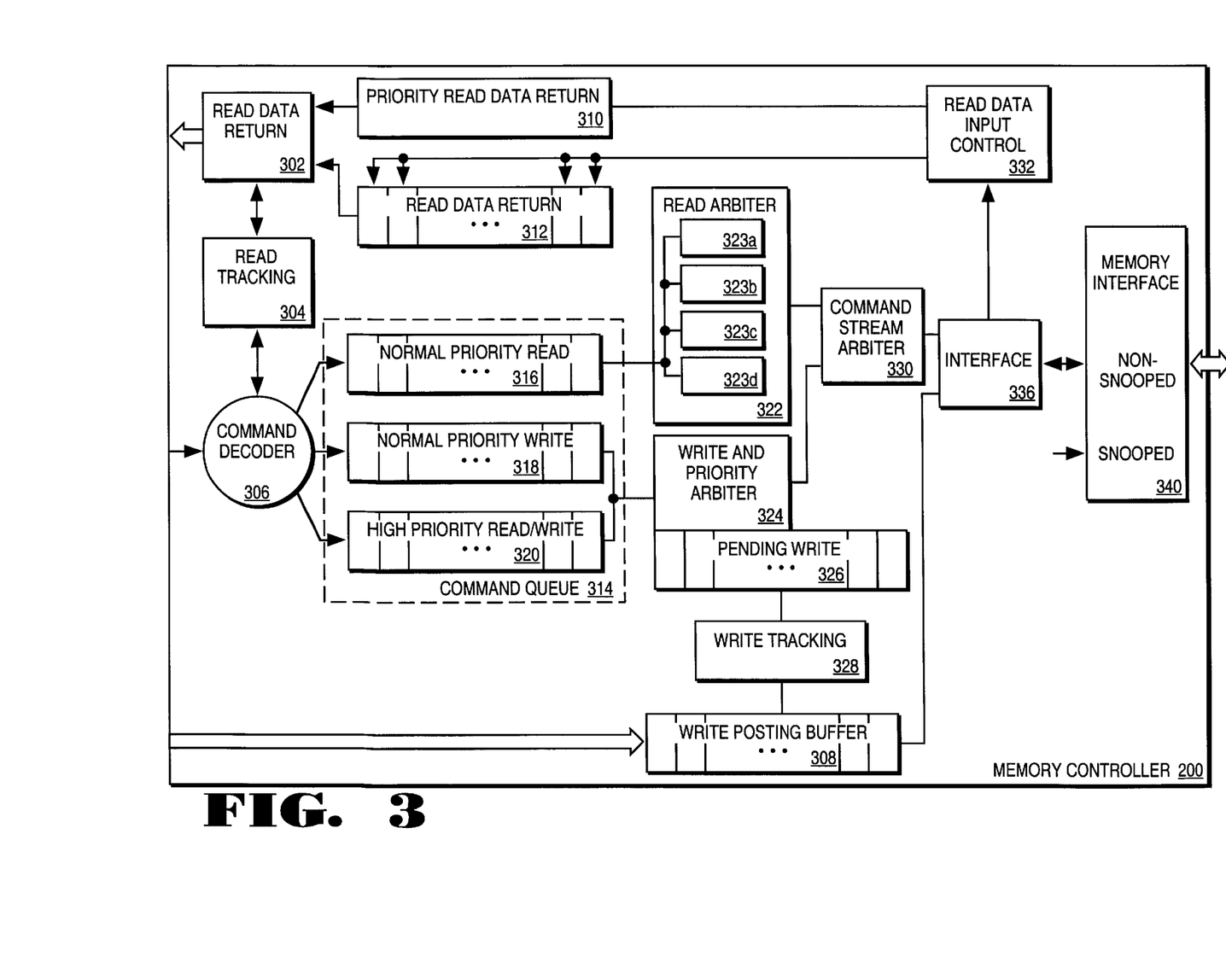
FIG. 3 illustrates details of one embodiment the memory controller 200 shown in FIG. 2.

Further details of the memory controller 200 are shown in FIG. 3. The memory controller 200 includes a command decoder 306, which receives commands and decodes them for the command queue block 314. As illustrated, the command queue block has three separate command queues, a normal priority read queue 316, a normal priority write queue 318, and a high priority read and write queue 320. These command queues are illustrated as three separate queues which is how they logically appear using the command token queuing techniques of the present invention.

Arbitration logic coupled to select commands from the command queue block includes a read arbiter 322, a write and priority arbiter 324, and a command stream arbiter 330. The read arbiter 322 includes four slots 323a–323d, which may be used to reorder memory accesses to reduce page breaks or to optimize based on another criteria such as command age.

The write and priority arbiter 324 includes a pending write queue 326, which assures that the command stream arbiter 330 only selects write commands which have data available for execution. This additional circuitry is provided because a write command may be received by the command decoder 306 prior to the write data being received by a write posting buffer 308. The write and priority arbiter communicates with the write posting buffer 308 through a write tracking circuit 328 in order to determine which writes are available for selection and execution.

The write tracking circuit 328 also helps detect blocked write commands by alerting the write and priority arbiter 324 if there is insufficient space in the pending write queue 326 or if there is insufficient space in the write posting buffer 308 for the data associated with a write command at the head of the normal priority write queue 318 or the high priority read and write queue 320. In that case, the write and priority arbiter 324 may raise the priority of at least one write command in the pending write queue 326, in order to make space in the write posting buffer 308 for the incoming data. The write tracking circuit 328 ensures that the data from the write posting buffer 308 is passed along to an interface circuit 336 before the buffer location is overwritten with the incoming data.

The command stream arbiter cooperates with the read arbiter 322 and the write and priority arbiter 324 to select a command for execution. While all of the queues in the command queue block 314 may not be simultaneously accessible in this embodiment because the normal priority write and high priority read/write queues may have a single read port, multiple commands may still reach the command stream arbiter 330 and be available for execution in the same bus cycle. For example, the command stream arbiter 330 may need to choose between a normal priority read from the read arbiter 322, a high priority read available at the write and priority buffer 324, and a high priority write also available from the pending write queue 326 at the write and priority arbiter 324 in the same clock cycle because its associated data arrived at the write posting buffer 308.

The command stream arbiter 330 passes commands to the interface circuit 336 which transforms commands to a format recognized by a memory interface circuit 340. In one embodiment, the interface circuit 336 receives A.G.P. commands, and the memory interface circuit 340 provides a Dynamic Random Access Memory (DRAM) interface. The memory interface circuit 340 also receives other system memory access requests such as processor or PCI requests. The A.G.P. input port to the memory interface 340 is labeled non-snooped because A.G.P. memory accesses do not provide memory coherency checks with other system components. On the other hand, PCI and/or processor memory accesses may include such coherency checks and are received at the snooped input port of the memory interface 340.

The interface circuit 336 also returns data from the memory interface 340 to a read data input control block 332. High priority data is returned in order and placed in a priority read data return buffer 310. Normal priority read data, however, may be returned out of order if the read arbiter 322 alters the sequence of incoming reads prior to their execution. In this case, the read data input control block 332 places data in a particular location in a read data return buffer 312, such that the data reflects the original request order when the read data return buffer 312 fills. A read data return block 302 first selects priority read data from the priority read data return buffer 310 if available, and subsequently returns the properly ordered normal priority read data to the requesting bus agent. Read tracking logic 304 tracks read commands from the time they reach the command decoder 306 until the time the requested data is returned by the read data return block 302.

Figure 4:
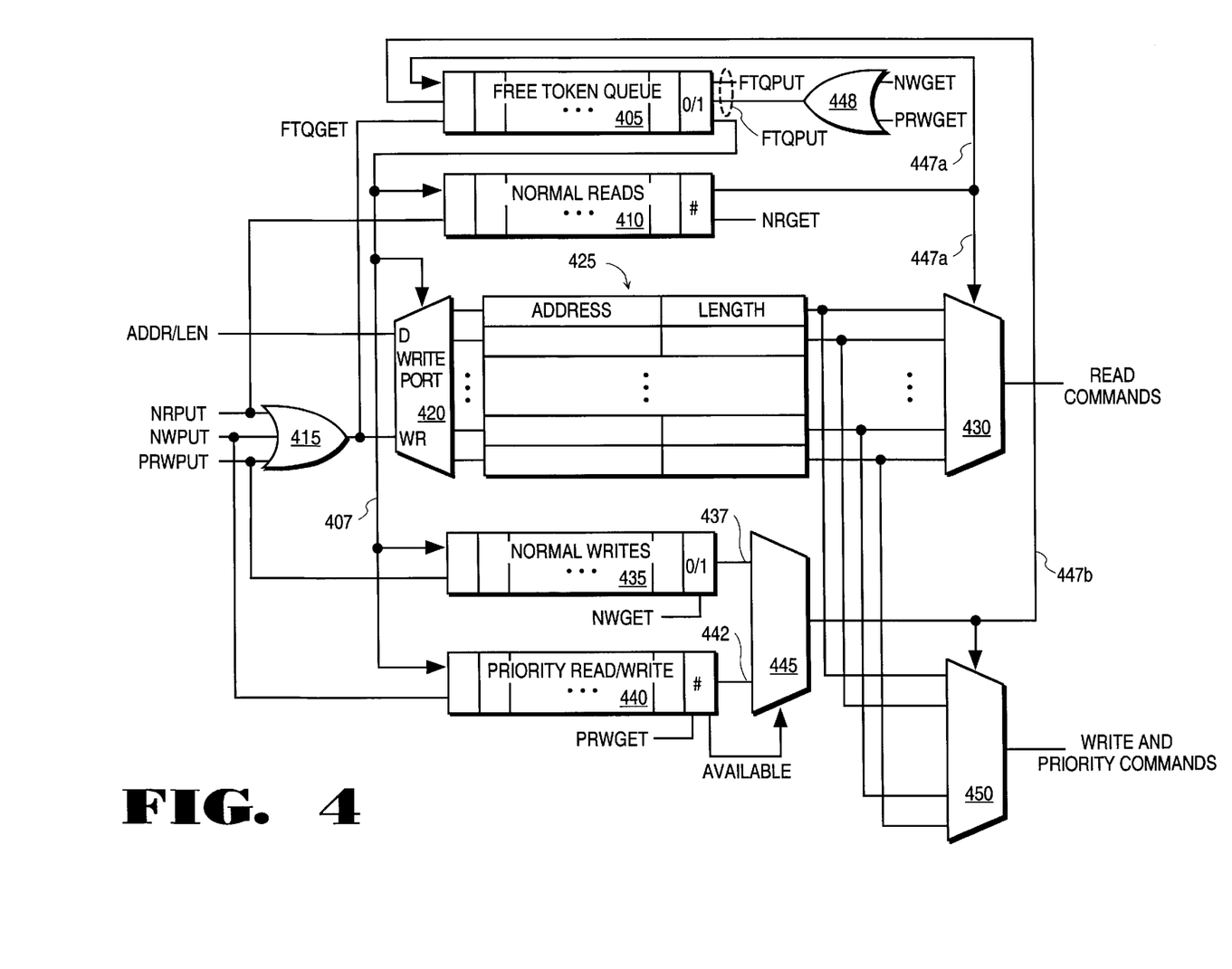
FIG. 4 illustrates details of one embodiment of the command queue block 314 of FIG. 3.
Figure 5:
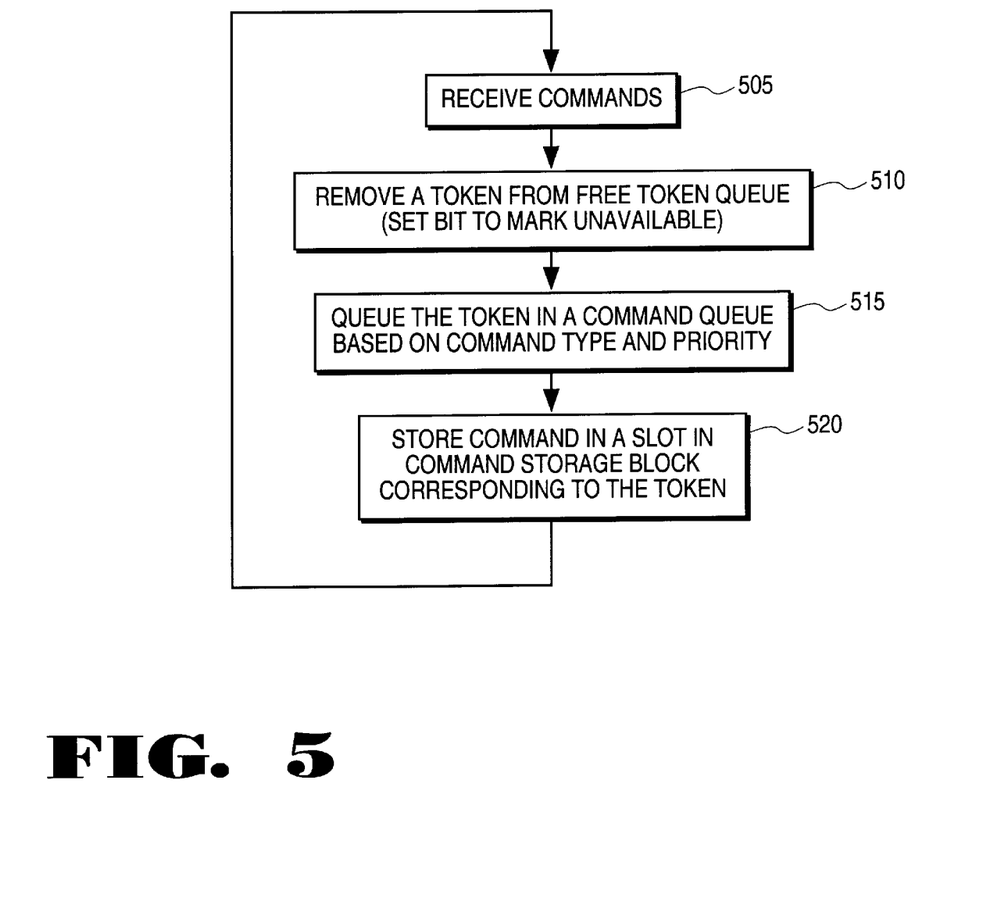
FIG. 5 illustrates one embodiment of a method of queuing commands according to the present invention.

FIG. 4 illustrates details of one embodiment of the command queue block 314 of FIG. 3. This embodiment queues and retrieves normal and high priority read and write commands such as those used with the A.G.P. protocol. The steps occurring in this embodiment are illustrated in FIG. 5, beginning with the receipt of a command in step 505. Address and length information is received by a data input of the write port 420 and subsequently stored in a command storage block 425. The write port 420 writes to the command storage block 425 when a normal priority read, a normal priority write, or a priority read or write occurs as indicated respectively by NRPUT, NWPUT, and PRWPUT. These three signals are logically ORed together by the OR gate 415 to generate a write signal which causes the write port 420 to write to the command storage block 425.

The location written to in the command storage block 425 is determined by a token removed from a free token queue 405, as indicated by step 510. The write signal generated by the OR gate 415 serves as a free token queue get (FTQGET) signal used to retrieve an available token from the free token queue 405. In one embodiment, the free token queue 405 is an array of bits, each of which may be set to a zero or a one to mark unavailable an entry in the command storage block 425. In other embodiments, the free token queue 405 may contain addresses or slot numbers of entries in the command storage block 425. In either case, the free token queue 405 maintains a record of available slots in the command storage block 425.

Line 407 connects the free token queue to a normal priority read queue 410, to the write port 420, to a normal priority write queue 435, and to a priority read and write queue 440. As indicated by step 515, this allows tokens to be queued in a command queue based upon their command type and priority. For example, when the NRPUT signal is asserted as a normal priority read command is received, a free token is removed from the free token queue 405 (NRPUT causes assertion of FTQGET) and stored in the normal priority read queue 410. Similarly, the NWPUT and the PRWPUT signals respectively place tokens in the normal priority write queue 435 and the priority read and write queue 440.

The write port 420 stores address and length information in a slot of the command storage block 425 corresponding to the token as shown in step 520. The exact correspondence between the token queued in step 515 and a command stored in the command storage block 425 in step 520 may vary in different embodiments. In one embodiment, each token queue simply stores the number of the slot in the command storage block 425 which contains the command corresponding to that token. The constraint on the command identification is that there be a one-to-one correspondence between the tokens and the command slots available in the command storage block 425.

Figure 6:
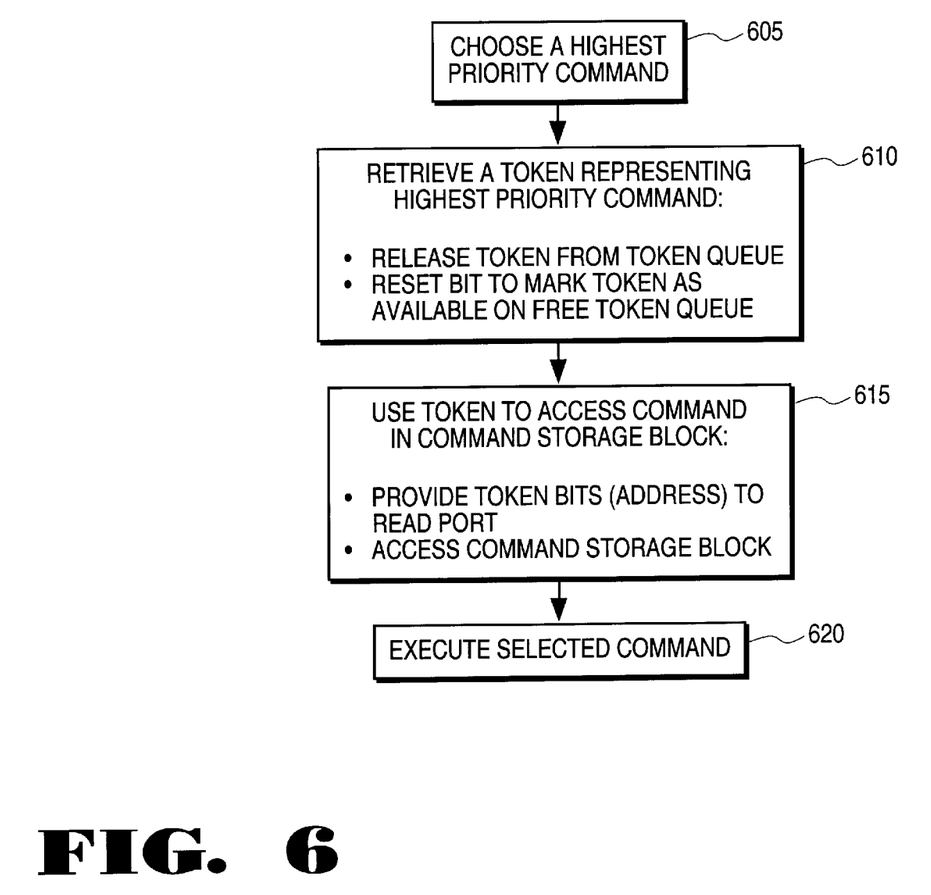
FIG. 6 illustrates one embodiment of a method of removing commands from a queue according to the present invention.

FIG. 6 illustrates a procedure for removing commands from the queues illustrated in FIG. 4. In step 605, a highest priority command is chosen by one or both of the read arbiter 322 and the write and priority arbiter 324. The overall priority is then dictated by the command stream arbiter 330. In one embodiment, high priority blocking write commands are selected first. A blocked write is a command which the memory controller is unable to buffer because its buffering facilities are full. Blocking commands are writes which are queued in the pending write queue 326 preceding a blocked write. Both normal and priority writes in the pending write queue 326 may become blocking writes if a subsequently received command is blocked due to full buffering facilities.

After unblocking high priority write commands, this embodiment next selects other high priority commands, preferring reads before unblocked high priority writes. Blocked normal priority writes are chosen next, followed by commands from the present normal priority command stream (i.e., the last one selected, either reads or writes), unless that normal priority command stream is empty. In one embodiment, all commands are considered, such that interposed high priority commands may switch the stream considered to be the present normal priority stream. In alternate embodiments, the value considered to be the normal priority stream is unaffected by high priority commands. If there are no more commands in the present normal priority command stream, this embodiment switches to the other normal priority command stream. Notably, these are rules of precedence, with each rule only being executed if none of the prior rules apply.

Other priority arbitration algorithms may be used with the present invention, but in any case, a highest priority command is selected in step 605. Since multiple read ports are provided (read ports 430 and 450), multiple commands may be selected at one time. In step 610, a token is retrieved representing a selected command. For example, when the highest priority command is a normal priority read command, a NRGET signal is generated to free a token from the normal priority read queue 410. The NRGET signal also serves as a first PTQPUT signal which causes the bit in the free token queue 405 corresponding to the slot number indicated by the token to be reset (to a value opposite the "unavailable" value), indicating that this slot is now available in the command storage block 425. The slot number is returned from the normal priority read queue 410 via a first token return line 447*a*. Thus, the token is at least figuratively replaced back in the free token queue 405 by resetting that bit.

As the bit is reset in the free token queue, the token is used to access the command of the command storage block as indicated by step 615. The bits of the token form an address provided to a read port 430. The read port 430 accesses the command storage block 425 and reads out the appropriate command. Any known storage array or register technique may be used to store the appropriate read commands and their lengths. Additionally, the various substeps shown for steps 610 and 615 may occur simultaneously or in an order different from that shown.

In the case where a normal priority write or a priority read or write command is selected, the process is similar. NWGET and PRWGET signals respectively release tokens from the normal priority write queue 435 and the priority read and write queue 440. A multiplexer 445 selects between a signal line 437 and a signal line 442 which provide the tokens from the normal priority write queue 435 and the priority read and write queue 440. If priority commands are available, they are always selected over normal priority writes as indicated by the AVAILABLE selector of the multiplexer 445, which comes from the priority read and write queue 440.

The multiplexer output, a second token return line 447*b*, allows the return of the selected token to the free token queue 405 and provides the selected token to a second read port 450. This second read port is used to reduce the number of logic gates in the path from the queue head to the read port output so commands are more rapidly available at the read port output. The use of multiple read ports also has the advantage that the read arbiter 322 shown in FIG. 3 can reorder reads while other commands are being accessed by the second read port 450. Since both the read port 430 and the read port 450 may simultaneously read commands, two token return lines 447*a* and 447*b* are used to return the released tokens. Additionally, OR gate 448 having NWGET and PRWGET as inputs generates a second FTQPUT signal to indicate when a token is being returned on this second token return line 447*b*.

In one alternate embodiment, a single read port with additional token selection circuitry is used. In that case, a selection circuit chooses from the multiplexer output 447*b* and signal line 447*a* or the three signal lines 447*a*, 437, and 442, before the selected token is provided to the single read port. Another alternative is to allow separate read ports for each token queue such that one command for each command type may be simultaneously taken from the command storage block 425. In either case, a command is read, and as shown in the step 620, that selected command is executed.

Thus, the present invention provides a method and apparatus for maintaining one or more queues of elements such as commands using one or more token queues which may be used in a variety of contexts. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a first token queue;
   a token assignment circuit coupled to queue a selected token in said first token queue in response to receiving an input element; and
   a storage block coupled to receive said input element and to store said input element in ar. element slot corresponding to said selected token.

2. The apparatus of claim 1 wherein said input element comprises an input command, and wherein said storage block comprises a command storage block, and further wherein said element slot comprises a command slot.

3. The apparatus of claim 2, further comprising a second token queue, wherein said token assignment circuit is coupled to queue said selected token in one of said first token queue and said second token queue.

4. The apparatus of claim 3 wherein said token assignment circuit queues said selected token by storing a command storage block slot number into one of said first token queue and said second token queue.

5. The apparatus of claim 3 further comprising
   a free token queue,
   wherein said token assignment circuit is coupled to mark as unavailable said selected token from said free token queue.

6. The apparatus of claim 5 wherein the free token queue comprises a plurality of stored bits, each of said plurality of stored bits corresponding to one slot in said command storage block.

7. The apparatus of claim 3 wherein said token assignment circuit further comprises a command decoder and wherein said selected token is queued in one of said first token queue and said second token queue according to an input command type determined by the command decoder.

8. The apparatus of claim 7 wherein said input command type includes an input command priority.

9. The apparatus of claim 3 further comprising a command selection circuit coupled to access commands from said command storage block by using a token from one of the first token queue and the second token queue.

10. The apparatus of claim 9 wherein said command selection circuit further comprises a first read port and a second read port coupled to said command storage block, said first read port being coupled to read commands from said command storage block indicated by said first token queue, said second read port being coupled to read commands from said command storage block indicated by said second token queue.

11. The apparatus of claim 9 wherein said command selection circuit further comprises a single read port coupled to said command storage block, said single read port being coupled to read commands from said command storage block indicated by either of said first token queue and said second token queue.

12. The apparatus of claim 7, further comprising a priority arbitration circuit coupled to select a highest priority token from one of said first token queue and said second token queue, the highest priority token corresponding to a highest priority command in said command storage block.

13. The apparatus of claim 12 wherein one of said first token queue and said second token queue is a high priority token queue and said highest priority token is a head token in said high priority token queue.

14. The apparatus of claim 12, further comprising:
a third token queue;
a token selection circuit selectably coupling either of the second token queue and the third token queue to the priority arbitration circuit.

15. The apparatus of claim 14 wherein said first token queue comprises a high priority read/write queue, said second token queue comprises a normal priority write queue, and said third token queue comprises a normal priority read queue.

16. The apparatus of claim 15 wherein said command selection circuit comprises:
a first read port coupled to read a normal priority read command from said command storage block addressed by a normal priority read token from said normal priority read queue; and
a second read port coupled to read a command from said command storage block addressed by a second token selected by said command selection circuit from one of said normal priority write queue and said high priority read/write queue.

17. A system comprising:
a processor;
a main memory;
a bus agent coupled to generate a plurality of commands to access said main memory;
a memory controller coupled to the main memory, the processor, and the bus agent, the memory controller being coupled to queue, in response to receiving said plurality of commands from said bus agent, a plurality of tokens into a plurality of token queues, each of said plurality of tokens representing one of said plurality of commands from bus agent, said plurality of commands having at least a first priority level and a second priority level and being stored in a storage block as indicated by said plurality of tokens in said plurality of token queues.

18. The system of claim 17 wherein said plurality of commands are queued into said plurality of token queues by priority level.

19. The system of claim 17 wherein said plurality of commands comprises:
a high priority read command;
a high priority write command;
a low priority read command; and
a low priority write command.

20. The system of claim 17 wherein the bus agent is a graphics accelerator and said main memory comprises dynamic random access memory.

21. The system of claim 17 further comprising:
a token assignment circuit coupled to queue said plurality of tokens into said plurality of token queues, wherein the storage block is a command storage block coupled to receive said plurality of commands indicated by said plurality of tokens.

22. A method of queuing commands, comprising the steps of:
receiving a first command having a first priority;
queuing a first token representing said first command in a first token queue in response to receiving said first command; and
storing said first command in a command storage block, wherein said command storage block comprises a command slot corresponding to said first token.

23. The method of claim 22 further comprising the steps of:
receiving a second command having a second priority, said second priority being higher than said first priority;
queuing a second token representing said second command in a second token queue; and
storing said second command in said command storage block.

24. The method of claim 23 further comprising the steps of:
retrieving a token from said second token queue; and
reading said second command from said command storage block.

25. The method of claim 22, before the step of queuing, further comprising the step of:
removing a selected token from a free token queue.

26. The method of claim 25 wherein the step of removing further comprises the step of:
setting a bit in said free token queue to mark said selected token as unavailable.

27. The method of claim 22, further comprising the steps of:
retrieving said first token from said first token queue;
accessing said first command in said command storage block using said first token; and
executing said first command.

28. The method of claim 27 wherein the step of retrieving said first token comprises the steps of:
freeing an entry on said first token queue; and
resetting a bit to mark said first token as available.

29. The method of claim 28 wherein the step of accessing further comprises the steps of:
providing said first token to a read port; and
addressing said command storage block using said first token.

30. The method of claim 29 wherein said step of providing said first token comprises the step of providing a plurality of bits representing a storage block slot number to said read port.

31. An apparatus comprising:
a first token queue;
a second token queue;
a free token queue;
a token assignment circuit coupled to queue a selected token in one of said first token queue and said second token queue in response to an input element and to mark as unavailable said selected token from said free token queue; and a storage block coupled to receive said input element and to store said input element in an element slot corresponding to said selected token.

32. The apparatus of claim 31 wherein said token assignment circuit is coupled to queue said selected token in one of said first token queue and said second token queue based on a type of said input element.

33. The apparatus of claim 31 wherein said token assignment circuit is coupled to queue said selected token in one of said first token queue and said second token queue based on a priority of said input element.

34. A method comprising:

receiving a first command having a first priority;

queuing a first token representing said first command in a first token queue;

storing said first command in a command storage block;

retrieving said first token from said first token queue;

accessing said first command in said command storage block using said first token;

executing said first command;

freeing an entry on said first token queue; and resetting a bit to mark said first token as available.

35. The method of claim 34 further comprising:

receiving a second command having a second priority, said second priority being higher than said first priority;

queuing a second token representing said second command in a second token queue; and storing said second command in said command storage block.

* * * * *